US012685988B2

(12) United States Patent  
Kim et al.

(10) Patent No.: US 12,685,988 B2  
(45) Date of Patent: Jul. 21, 2026

(54) APPARATUS AND PROCESS FOR PREPARING POLYAMIDE

(71) Applicant: HANWHA SOLUTIONS CORPORATION, Seoul (KR)

(72) Inventors: Dokyoung Kim, Daejeon (KR); Do Hyun Seo, Daejeon (KR); Jinseo Lee, Daejeon (KR)

(73) Assignee: HANWHA SOLUTIONS CORPORATION, Seoul (KR)

( * ) Notice: Subject to any disclaimer, the term of this patent is extended or adjusted under 35 U.S.C. 154(b) by 1077 days.

(21) Appl. No.: 17/784,137

(22) PCT Filed: Dec. 4, 2020

(86) PCT No.: PCT/KR2020/017584  
§ 371 (c)(1),  
(2) Date: Jun. 10, 2022

(87) PCT Pub. No.: WO2021/118165  
PCT Pub. Date: Jun. 17, 2021

(65) Prior Publication Data  
US 2023/0033350 A1     Feb. 2, 2023

(30) Foreign Application Priority Data

Dec. 12, 2019     (KR) ........................ 10-2019-0165747

(51) Int. Cl.  
B01J 19/00     (2006.01)  
B01J 4/00     (2006.01)  
(Continued)

(52) U.S. Cl.  
CPC .......... B01J 19/0066 (2013.01); C08G 69/28 (2013.01); B01J 2219/00085 (2013.01); (Continued)

(58) Field of Classification Search  
CPC .......... B01J 19/0066; B01J 2219/00085; B01J 2219/00452; B01J 2219/00481; (Continued)

(56) References Cited

U.S. PATENT DOCUMENTS 5,635,590 A * 6/1997 Rink ...................... C08G 63/78  
203/18  
2002/0188067 A1 12/2002 White  
2007/0161815 A1 7/2007 Osborne

FOREIGN PATENT DOCUMENTS

CN 101600680 A 12/2009  
JP H0241318 A 2/1990  
(Continued)

OTHER PUBLICATIONS

International Search Report dated Apr. 2, 2021.

*Primary Examiner* — Huy Tram Nguyen  
(74) *Attorney, Agent, or Firm* — Harvest IP Law, LLP

(57) ABSTRACT

The present invention relates to an apparatus and a process for preparing a polyamide. Specifically, the present invention relates to an apparatus and a process for preparing a polyamide that enhances the degree of fixation of a diamine during the polycondensation of a diamine and a dicarboxylic acid. The apparatus and process for preparing a polyamide according to an embodiment of the present invention are capable of enhancing the degree of fixation of a diamine during the polycondensation reaction of a diamine and a dicarboxylic acid.

7 Claims, 1 Drawing Sheet

(51) Int. Cl.
  *B01J 19/18* (2006.01)
  *C08G 69/28* (2006.01)

(52) U.S. Cl.
  CPC ................. *B01J 2219/00452* (2013.01); *B01J 2219/00481* (2013.01); *B01J 2219/00716* (2013.01); *B01J 2219/00736* (2013.01)

(58) Field of Classification Search
  CPC .... B01J 2219/00716; B01J 2219/00736; B01J 4/008; B01J 19/18; B01J 2219/00094; C08G 69/28; C08G 69/48
  USPC ........................................................ 422/134
  See application file for complete search history.

(56) References Cited

FOREIGN PATENT DOCUMENTS

| | | | |
|---|---|---|---|
| JP | 9104751 | A | 4/1997 |
| JP | 2002220465 | A | 8/2002 |
| JP | 2003119284 | A | 4/2003 |
| JP | 2009512771 | A | 3/2009 |
| JP | 2009286896 | A | 12/2009 |
| KR | 100969262 | B1 | 7/2010 |
| KR | 1020120102055 | A | 9/2012 |
| KR | 10-1813400 | B1 | 12/2017 |
| WO | 2004024795 | A1 | 3/2004 |

* cited by examiner

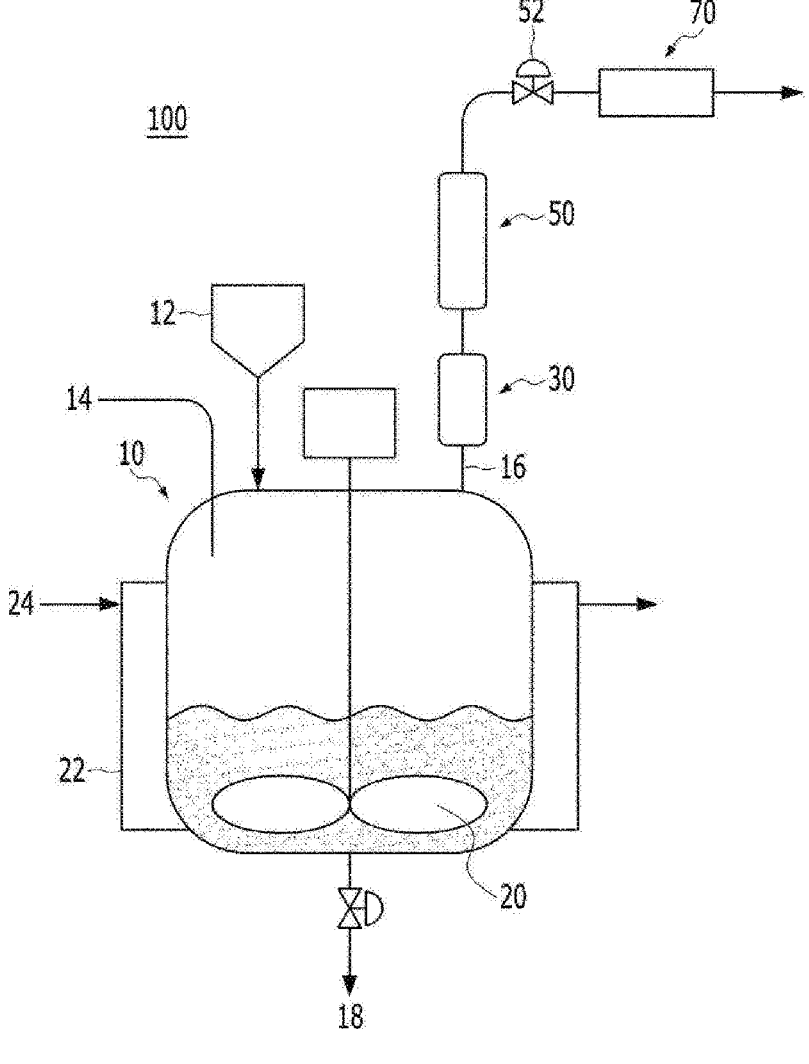

APPARATUS AND PROCESS FOR PREPARING POLYAMIDE

CROSS-REFERENCE TO RELATED APPLICATIONS

This application is a National Stage of International Application No. PCT/KR2020/017584 filed Dec. 4, 2020, claiming priority based on Korean Patent Application No. 10-2019-0165747 filed Dec. 12, 2019, the disclosure of which is incorporated herein by reference in its entirety.

TECHNICAL FIELD

The present invention relates to an apparatus and a process for preparing a polyamide. Specifically, the present invention relates to an apparatus and a process for preparing a polyamide capable of enhancing the degree of fixation of a diamine during the polycondensation of a diamine and a dicarboxylic acid.

BACKGROUND ART

A polyamide refers to a polymer that comprises an amide (—CO—NH—) unit in its main chain. A polyamide may be prepared from two different monomer units of bifunctionality, each containing two identical reactive groups (e.g., —NH$_2$ or —COOH). Alternatively, it may be prepared from one monomer unit of bifunctionality, containing one amino group and one carboxyl group or capable of forming these groups. For example, a polyamide may be prepared by a polycondensation reaction of a diamine and a dicarboxylic acid, a polycondensation reaction of an aminocarboxylic acid, or a ring-opening polymerization reaction of a lactam.

Polyamides may be classified into aliphatic polyamides, aromatic polyamides, and alicyclic polyamides according to their molecular structure. Aliphatic polyamides are commonly called nylon, and aromatic polyamides are commonly called Aramid.

In general, polyamides are excellent in physical properties such as rigidity, friction resistance, abrasion resistance, oil resistance, and solvent resistance, and are readily melt-molded. Thus, they are widely used as materials for clothing, textiles for industrial materials, and engineering plastics.

Meanwhile, when a polyamide is produced by a polycondensation reaction of a diamine and a dicarboxylic acid, a method is known in which a diamine is added to a dicarboxylic acid in a molten state, and the water of condensation formed by the reaction is removed while the polycondensation reaction is carried out (see, e.g., Japanese Laid-open Patent Publication No. 1997-104751, Korean Laid-open Patent Publication No. 2012-0102055, and Korean Patent No. 1813400). In this method, however, the diamine that has not been fixed is removed together with the condensation water, so that the equivalent ratio between the two monomers in the reactor may deviate from a desired value.

Accordingly, there is a need for a technology capable of enhancing the degree of fixation of a diamine during the polycondensation reaction of a diamine and a dicarboxylic acid.

DISCLOSURE OF THE INVENTION

Technical Problem

An object of the present invention is to provide an apparatus and a process for preparing a polyamide capable of enhancing the degree of fixation of a diamine during the polycondensation of a diamine and a dicarboxylic acid.

Solution to the Problem

According to an embodiment of the present invention for accomplishing the object, there is provided an apparatus (100) for preparing a polyamide, which comprises a reactor (10) provided with a stirrer (20) in which polycondensation of a diamine and a dicarboxylic acid is carried out; and a buffer (30), a fractionation distillation column (50), and a condenser (70) sequentially installed above the reactor (10). Here, the buffer (30) has an inner diameter larger than that of a pipe connection unit (16) by 10% or more and a ratio of length to inner diameter (L/D) of 1 or more, and the content of the diamine in the condensation water discharged through the condenser is 1% by mole or less.

In the apparatus (100) for preparing a polyamide according to an embodiment of the present invention, the reactor (10) may further comprise a heating device capable of heating the reaction mixture inside the reactor to a temperature of 150 to 300° C.

Preferably, the buffer (30) may have an inner diameter larger than that of the pipe connection unit (16) by 20% or more and a ratio of length to inner diameter (L/D) of 2 to 10.

Specifically, the buffer (30) is neither heated nor cooled separately.

The fractional distillation column (50) may have a number of plates, or theoretical plates, of 5 to 30 and an operating temperature of 100 to 150° C.

In addition, the condenser (70) may have an operating temperature of 0 to 20° C.

According to another embodiment of the present invention, there is provided a process for preparing a polyamide, which comprises (1) subjecting a mixture comprising a diamine and a dicarboxylic acid at an equivalent ratio of 1.0:1.0 to 1.05:1.0 to a direct polycondensation in a reactor while discharging the condensation water in a vapor phase generated by the polycondensation to the outside of the reactor; (2) changing the flow rate of the condensation water in a vapor phase discharged from the reactor; (3) subjecting the condensation water in a vapor phase to fractional distillation and circulating the condensed monomer to the reactor; and (4) condensing the condensation water in a vapor phase after the fractional distillation, wherein the content of the diamine in the condensation water condensed in step (4) is 1% by mole or less.

Specifically, the dicarboxylic acid may comprise at least one of an aliphatic dicarboxylic acid selected from the group consisting of oxalic acid, malonic acid, succinic acid, glutaric acid, adipic acid, pimelic acid, suberic acid, azelaic acid, sebacic acid, undecane diacid, dodecane diacid, tridecane diacid, tetradecane diacid, pentadecane diacid, hexadecane diacid, heptadecane diacid, and octadecane diacid; an aliphatic cyclic dicarboxylic acid selected from the group consisting of cyclohexane dicarboxylic acids; and an aromatic dicarboxylic acid selected from the group consisting of phthalic acid, isophthalic acid, terephthalic acid, and naphthalene dicarboxylic acid. Preferably, the dicarboxylic acid may be adipic acid.

In addition, the diamine may comprise at least one of an aliphatic diamine selected from the group consisting of ethylenediamine, 1,3-diaminopropane, 1,4-diaminobutane, 1,5-diaminopentane, 1,6-diaminohexane, 1,7-diaminoheptane, 1,8-diaminooctane, 1,9-diaminononane, 1,10-diaminodecane, 1,11-diaminoundecane, 1,12-diaminododecane, 1,13-diaminotridecane, 1,14-diaminotetradecane, 1,15-diaminopentadecane, 1,16-diaminohexadecane, 1,17-di-aminoheptadecane, 1,18-diaminooctadecane, 1,19-di-aminononadecane, 1,20-diaminoicosane, and 2-methyl-1,5-diaminopentane; an aliphatic cyclic diamine selected from the group consisting of cyclohexane diamine and bis-(4-aminocyclohexyl)methane; and an aromatic diamine selected from xylenediamines. Preferably, the diamine may be m-xylenediamine or p-xylenediamine.

Specifically, step (1) may comprise injecting the dicar-boxylic acid into the reactor; purging the inside of the reactor with an inert gas; raising the temperature in the reactor to 160 to 200° C.; adding the diamine to the reactor continuously or intermittently; and adjusting the tempera-ture in the reactor such that the temperature in the reactor is finally 160 to 250° C. when the addition of diamine is completed.

Here, the step of injecting the dicarboxylic acid into the reactor may be carried out by injecting the dicarboxylic acid in a solid phase into the reactor and melting it; or injecting the dicarboxylic acid that has been melted in a separate device into the reactor.

In addition, the step of adding the diamine to the reactor continuously or intermittently may be carried out for 0.5 to 4 hours.

The polycondensation of the diamine and the dicarboxylic acid in step (1) may be a primary polymerization or a pre-polymerization, and the pressure in the reactor may be atmospheric pressure to 1.2 bar.

The process for preparing a polyamide according to an embodiment of the present invention may further comprise subjecting the polyamide primarily polymerized in step (1) to a secondary polymerization or post-polymerization in the same reactor or after transferring it to another reactor.

In such an event, the secondary polymerization of a polyamide may be carried out at a pressure of 0.99 to 0.01 bar and a temperature of 150 to 300° C. for 0.5 to 4 hours.

Advantageous Effects of the Invention

The apparatus and process for preparing a polyamide according to an embodiment of the present invention are capable of enhancing the degree of fixation of a diamine during the polycondensation reaction of a diamine and a dicarboxylic acid. As a result, since unreacted carboxyl end groups present in the polyamide are reduced, it is possible to prepare a high-molecular-weight polyamide.

BRIEF DESCRIPTION OF THE DRAWINGS

FIG. 1 is a cross-sectional front view of an apparatus for preparing a polyamide according to an embodiment of the present invention.

DESCRIPTION OF THE NUMERALS

| | |
|---|---|
| 100: apparatus for preparing a polyamide | |
| 10: reactor | 12: diamine supply tank |
| 14: purge line | 16: pipe connection unit |
| 18: outlet | 20: stirrer |
| 22: jacket | 24: heating medium |
| 30: buffer | 50: fractional distillation column |
| 52: pressure regulating valve | 70: condenser |

BEST EMBODIMENT FOR CARRYING OUT THE INVENTION

Hereinafter, an apparatus and a process for preparing a polyamide according to an embodiment of the present invention will be described in more detail with reference to the accompanying drawings.

Apparatus for Preparing a Polyamide

Referring to FIG. 1, the apparatus (100) for preparing a polyamide according to an embodiment of the present invention comprises a reactor (10) provided with a stirrer (20) in which polycondensation of a diamine and a dicar-boxylic acid is carried out; and a buffer (30), a fractionation distillation column (50), and a condenser (70) sequentially installed above the reactor (10).

In a specific embodiment of the present invention, the reactor (10) in which the polycondensation of a diamine and a dicarboxylic acid is carried out may be a stirred-tank reactor equipped with a stirrer (20). Here, the stirrer (20) is not particularly limited in its kind as long as it can suffi-ciently stir a reaction mixture of a diamine and a dicarbox-ylic acid. In a specific embodiment of the present invention, the stirrer (20) may be of a helical ribbon type or an anchor type.

The dicarboxylic acid as one of the monomers for polym-erizing a polyamide may be charged into the reactor (10) in a solid phase and then melted. Alternatively, it may be melted in advance in a separate melt tank (now shown), and a predetermined amount thereof may be charged into the reactor.

The diamine as another monomer for polymerizing a polyamide may be introduced into the reactor from a diamine supply tank (12) using a metering pump (not shown). Here, the specific type and configuration of the diamine supply tank (12) and the metering pump are not particularly limited as long as the diamine can be supplied meteredly to the reactor (10).

The reactor (10) may be provided with a purge line (14) capable of purging the inside of the reactor with an inert gas such as nitrogen.

The reactor (10) may be provided with a pipe connection unit (16) for discharging the condensation water formed by the polycondensation of the diamine and the dicarboxylic acid to the outside of the reactor (10). The condensation water in a vapor phase discharged from the reactor (10) through the pipe connection unit (16) passes through a buffer (30), a fractionation distillation column (50), and a con-denser (70) to be described later.

The reactor (10) may be provided with an outlet (18) to discharge a polyamide produced as a result of polymeriza-tion to the outside of the reactor (10) for recovering thereof. In the case where a primary polymerization or a pre-polymerization of a polyamide alone is carried out in the reactor (10), the molten polyamide discharged from the reactor (10) through the outlet (18) may be transferred to another reactor for a secondary polymerization or a post-polymerization. Alternatively, in the case where both pri-mary polymerization and secondary polymerization of a polyamide are carried out in the reactor (10), the molten polyamide discharged from the reactor (10) through the outlet (18) may be transferred to a melt storage tank (not shown) and then to a pelletizer, or transferred directly to a pelletizer without going through a melt storage tank. In the pelletizer, the polyamide may be cooled in water and cut into pellets.

In addition, the reactor (10) may be further provided with a heating device capable of heating the reaction mixture inside the reactor to a temperature of 150 to 300° C. In a specific embodiment of the present invention, high-temperature and high-pressure steam (24), hot water (24), or heat transfer fluid (24) may be passed through the jacket (22) provided on the outer wall of the reactor (10) to heat the reaction mixture inside the reactor. But the heating device and the heating medium are not particularly limited thereto.

The apparatus (100) for preparing a polyamide according to an embodiment of the present invention comprises a buffer (30). Specifically, the condensation water in a vapor phase discharged from the reactor (10) through the pipe connection unit (16) is introduced to the buffer (30).

The condensation water in a vapor phase discharged from the reactor (10) through the pipe connection unit (16) usually contains a certain amount of monomer components, particularly, a diamine discharged from the reactor together. As the content of the monomer components, particularly a diamine, discharged together with the condensation water increases, the equivalent ratio between the monomers in the reactor (10) deviates from a predetermined value, and the loss of the monomers increases, which is not preferable. Accordingly, it is preferable that the condensation water in a vapor phase discharged from the reactor (10) is subjected to fractional distillation to separate the monomers contained therein, which are to be circulated to the reactor; and that the condensation water is then condensed and discharged from the reaction system.

The present inventors have discovered that if the flow rate (or residence time) of the condensation water in a vapor phase discharged from the reactor (10) is changed before it passes through a fractionation column (50) to be described later to separate the monomers contained therein, the content of monomers, particularly a diamine, present in the condensation water ultimately discharged from the reaction system after being condensed is significantly reduced.

Here, the specific type and configuration of the buffer (30) are not particularly limited as long as it can change the flow rate of the condensation water in a vapor phase. In a specific embodiment of the present invention, the buffer (30) may have a cylindrical shape.

In such a case, the inner diameter of the buffer (30) may be greater than the inner diameter of the pipe connection unit (16) by 10% or more, 20% or more, 30% or more, 40% or more, 50% or more, 60% or more, 70% or more, 80% or more, 90% or greater, or 100% or more. Preferably, the inner diameter of the buffer (30) may be greater than the inner diameter of the pipe connection unit (16) by 20% or more.

In addition, the buffer (30) may have a ratio (L/D) of length to inner diameter of 1 or more, 2 or more, 3 or more, 2 to 10, 3 to 8, 3 to 6, or 3 to 5. Preferably, the L/D of the buffer (30) may be 2 to 10.

The buffer (30) may be maintained at room temperature without a separate heating and/or cooling device. However, if necessary for the operation of a fractionation distillation column (50) and a condenser (70) to be described later, a heating and/or cooling device may be installed in the buffer (30).

The apparatus (100) for preparing a polyamide according to an embodiment of the present invention comprises a fractionation distillation column (50). Specifically, the condensation water in a vapor phase that has passed through the buffer (30) is introduced into the fractionation distillation column (50).

Here, the specific type and configuration of the fractionation distillation column (50) are not particularly limited as long as it can separate the monomer components, particularly a diamine, present in the condensation water from the condensation water and circulate it to the reactor (10). In a specific embodiment of the present invention, a diamine having a boiling point higher than that of water is separated from the condensation water in the fractionation distillation column (50), condensed, and then circulated to the reactor (10). The monomers, particularly a diamine, separated and condensed in the fractionation distillation column (50) may be circulated to the reactor (10) through the pipe connection unit (16) or to the reactor (10) through a separate line (not shown).

Specifically, the fractional distillation column (50) may have a number of plates of 5 to 30. In such an event, the number of plates is not particularly limited to the above range as long as the condensation water and the monomers, particularly a diamine, can be sufficiently separated. In a specific embodiment of the present invention, the fractional distillation column (50) may have a number of plates of 5 to 25, 5 to 20, 5 to 15, or 5 to 10.

In addition, the fractional distillation column (50) may be in a form in which a packing material is filled such that the number of theoretical plates is 5 to 30. In such an event, the number of theoretical plates is not particularly limited to the above range as long as the condensation water and the monomers, particularly a diamine, can be sufficiently separated. In a specific embodiment of the present invention, the fractional distillation column (50) may have a number of theoretical plates of 5 to 25, 5 to 20, 5 to 15, or 5 to 10.

In addition, the fractionation distillation column (50) may comprise a reboiler, a condenser, and a reflux drum, if necessary. Their configuration and operating conditions thereof may be selected within the ranges obvious to those skilled in the art.

Meanwhile, the operating temperature of the fractionation distillation column (50) is preferably 100 to 150° C. In such an event, the operating temperature of the fractionation distillation column (50) may refer to the temperature of the uppermost part of the column. The monomers, particularly a diamine, present in the condensation water can be sufficiently separated within the above range. However, the temperature of the fractionation distillation column (50) may be outside the above range depending on the type of a diamine.

In a specific embodiment of the present invention, a pressure regulating valve (52) may be provided between the fractionation distillation column (50) and a condenser (70) to be described later. The specific type and configuration of the pressure regulating valve (52) are not particularly limited as long as it can adjust the pressure in the reactor (10) to atmospheric pressure or higher, preferably atmospheric pressure to 1.2 bar.

In addition, in the case where both primary polymerization and secondary polymerization of a polyamide are carried out in the reactor (10), the reactor (10) may be further provided with equipment (not shown) capable of further lowering the pressure in the reactor. For example, in the case where the secondary polymerization is further carried out in the reactor (10), the pressure in the reactor may be maintained at 0.99 to 0.01 bar.

The apparatus (100) for preparing a polyamide according to an embodiment of the present invention comprises a condenser (70). Specifically, the condensation water from which at least a portion of the diamine has been removed through the fractionation distillation column (50) is introduced into the condenser (70).

Here, the specific type and configuration of the condenser (70) are not particularly limited as long as it can condense the condensation water in a vapor phase. In a specific embodiment of the present invention, the condensation water in a vapor phase may be condensed in the condenser (70) using a cooling medium such as cooling water.

Preferably, the condenser (70) may have an operating temperature of 0 to 20° C. The condensation water can be sufficiently condensed within the above range. The polymerization rate of a polyamide may be controlled through the discharge rate of the condensation water condensed in the condenser (70) and discharged from the reaction system.

Although it is not bound by any theory, it is understood that, in the apparatus for preparing a polyamide according to an embodiment of the present invention, the buffer (30) changes the flow rate of the condensation water in a vapor phase, thereby serving to play a role in reducing the content of the monomer components, particularly a diamine component, discharged from the reactor together with the condensation water. Accordingly, in the apparatus for preparing a polyamide according to an embodiment of the present invention, the content of a diamine in the condensation water discharged from the condenser (70) may be 1.0% by mole or less. Preferably, the content of a diamine in the condensation water discharged from the condenser (70) may be 0.8% by mole or less, 0.5% by mole or less, 0.2% by mole or less, or 0.1% by mole or less.

Process for Preparing a Polyamide

The process for preparing a polyamide according to an embodiment of the present invention comprises (1) subjecting a mixture comprising a diamine and a dicarboxylic acid at an equivalent ratio of 1.0:1.0 to 1.05:1.0 to a direct polycondensation in a reactor while discharging the condensation water in a vapor phase generated by the polycondensation to the outside of the reactor; (2) changing the flow rate of the condensation water in a vapor phase discharged from the reactor; (3) subjecting the condensation water in a vapor phase to fractional distillation and circulating the condensed monomer to the reactor; and (4) condensing the condensation water in a vapor phase after the fractional distillation.

Step (1)

In step (1), a mixture comprising a diamine and a dicarboxylic acid at an equivalent ratio of 1.0:1.0 to 1.05:1.0 is subjected to a direct polycondensation in a reactor while the condensation water in a vapor phase generated by the polycondensation is discharged to the outside of the reactor.

Here, details on the reactor are as described above in the preparation apparatus.

First, the dicarboxylic acid as one of the monomers for polymerizing a polyamide is charged into the reactor (10) in a solid phase and then melted. Alternatively, it is melted in advance in a separate melt tank (now shown), and a predetermined amount thereof may be charged into the reactor.

In a specific embodiment of the present invention, examples of the dicarboxylic acid used in the polymerization of a polyamide include aliphatic dicarboxylic acids such as oxalic acid, malonic acid, succinic acid, glutaric acid, adipic acid, pimelic acid, suberic acid, azelaic acid, sebacic acid, undecane diacid, dodecane diacid, tridecane diacid, tetradecane diacid, pentadecane diacid, hexadecane diacid, heptadecane diacid, and octadecane diacid; aliphatic cyclic dicarboxylic acids such as cyclohexane dicarboxylic acids; and aromatic dicarboxylic acids such as phthalic acid, isophthalic acid, terephthalic acid, and naphthalene dicarboxylic acid, but it is not particularly limited thereto. Preferably, the dicarboxylic acid may be adipic acid.

While the molten dicarboxylic acid in the reactor (10) is stirred with the stirrer (20), an inert gas such as nitrogen is supplied through the purge line (14) to sufficiently purge the inside of the reactor (10).

Thereafter, the temperature in the reactor is raised to a temperature of 160 to 200° C. at which an amidation reaction is substantially carried out. Specifically, the temperature in the reactor is set such that an oligomer and/or a low-molecular-weight polyamide as an intermediate product is maintained in a molten state to ensure uniform fluidity of the entire reaction system while a diamine is added.

Subsequently, a diamine is added to the reactor (10) continuously or intermittently.

Examples of the diamine used in the polymerization of a polyamide include aliphatic diamines selected from the group consisting of ethylenediamine, 1,3-diaminopropane, 1,4-diaminobutane, 1,5-diaminopentane, 1,6-diaminohexane, 1,7-diaminoheptane, 1,8-diaminooctane, 1,9-diaminononane, 1,10-diaminodecane, 1,11-diaminoundecane, 1,12-diaminododecane, 1,13-diaminotridecane, 1,14-diaminotetradecane, 1,15-diaminopentadecane, 1,16-diaminohexadecane, 1,17-diaminoheptadecane, 1,18-diaminooctadecane, 1,19-diaminononadecane, 1,20-diaminoicosane, and 2-methyl-1,5-diaminopentane; aliphatic cyclic diamines selected from the group consisting of cyclohexane diamine and bis-(4-aminocyclohexyl)methane; and aromatic diamines selected from xylenediamines Preferably, the diamine may be m-xylenediamine or p-xylenediamine.

The diamine is preferably added over 0.5 to 4 hours such that the reaction can be carried out slowly while the reaction mixture is maintained in a molten state.

In addition, it is preferable to adjust the temperature in the reactor such that the temperature in the reactor when the diamine is completely added becomes 160 to 250° C. Here, since the rate of temperature elevation in the reactor is determined by the heat of amidation reaction, the latent heat of vaporization of the condensation water, and the amount of heat supplied, the addition rate of a diamine is preferably controlled such that the temperature in the reactor falls within the above range when the diamine is completely added.

The polycondensation of the diamine and the dicarboxylic acid in step (1) may be a primary polymerization or a pre-polymerization. Here, the pressure in the reactor during the addition of a diamine is not particularly limited, but it is preferable to adjust the pressure such that the boiling point of the diamine is not lower than the melting point of the reaction mixture. Preferably, the pressure in the reactor may be from atmospheric pressure to 1.2 bar.

In step (1), the equivalent ratio of the diamine to the dicarboxylic acid subjected to polycondensation is 1.0:1.0 to 1.05:1.0. Preferably, the equivalent ratio of the diamine to the dicarboxylic acid may be 1.0:1.0 to 1.03:1.0.

Meanwhile, in step (1), the condensation water in a vapor phase generated by the polycondensation of the diamine and the dicarboxylic acid is discharged to the outside of the reactor.

The process for preparing a polyamide according to an embodiment of the present invention may further comprise subjecting the polyamide primarily polymerized in step (1) to a secondary polymerization or a post-polymerization in the same reactor or after transferring it to another reactor.

In such an event, the secondary polymerization of a polyamide may be carried out at a pressure of 0.99 to 0.01 bar and a temperature of 150 to 300° C. for 0.5 to 4 hours, but the reaction conditions are not particularly limited thereto.

Step (2)

In step (2), the flow rate of the condensation water in a vapor phase discharged from the reactor is changed.

As described above in the preparation apparatus, the condensation water in a vapor phase discharged from the reactor is subjected to fractional distillation to separate the monomers contained therein, which are to be circulated to the reactor, and the condensation water is then condensed and discharged from the reaction system. In a specific embodiment of the present invention, it has been discovered that if the flow rate (or residence time) of the condensation water in a vapor phase discharged from the reactor is changed, the content of monomers, particularly a diamine, present in the condensation water ultimately discharged from the reaction system after being condensed is significantly reduced.

In a specific embodiment of the present invention, the change in the flow rate of the condensation water in a vapor phase discharged from the reactor may be performed by passing the condensation water in a vapor phase through a buffer (30). Here, details on the buffer (30) are as described above in the preparation apparatus.

Step (3)

In step (3), the condensation water in a vapor phase is subjected to fractional distillation, and the condensed monomer is circulated to the reactor.

In a specific embodiment of the present invention, the fractional distillation of the condensation water in a vapor phase may be carried out by passing the condensation water in a vapor phase, which has passed through the buffer (30), through the fractionation distillation column (50) operated at a temperature of 100 to 150° C. Here, details on the fractionation distillation column (50) are as described above in the preparation apparatus.

Step (4)

In step (4), the condensation water in a vapor phase after the fractional distillation is condensed. The condensed condensation water may be discharged from the reaction system.

In a specific embodiment of the present invention, the condensation water in a vapor phase, which has passed through the fractionation distillation column (50), may be condensed in the condenser (70) operated at a temperature of 0 to 20° C. Here, details on the condenser (70) are as described above in the preparation apparatus.

In the process for preparing a polyamide according to an embodiment of the present invention, the content of a diamine in the condensation water discharged from the condenser (70) may be 1.0% by mole or less. Preferably, the content of a diamine in the condensation water discharged from the condenser (70) may be 0.8% by mole or less, 0.5% by mole or less, 0.2% by mole or less, or 0.1% by mole or less.

EMBODIMENTS FOR CARRYING OUT THE INVENTION

Example

Example 1

A buffer having an inner diameter of 6.2 cm and an L/D of 3.9 and a Vigreux-type fractionation distillation column (corresponding to theoretical height: 8 cm, number of plates: 5) was installed on a 500-ml glass reactor. The connection tube between the reactor and the buffer had an inner diameter of 2 cm. The temperature of the buffer and the fractionation distillation column was maintained at room temperature and 100° C., respectively. The reactor was charged with 77.5 g (0.53 mole) of adipic acid having a purity of 99.5% and then sufficiently purged with nitrogen. Subsequently, it was heated to 170° C. with stirring. Then, 72 g (0.53 mole) of m-xylenediamine having a purity of 99.5% was added dropwise over 120 minutes using a metering pump, and the resulting condensation water was removed outside the reactor. The temperature in the reactor was adjusted stepwise such that it finally reached 240° C. upon completion of the dropwise addition of m-xylenediamine Upon the dropwise addition of m-xylenediamine, it was maintained for 90 minutes. Then, the temperature inside the reactor was raised to 260° C., and the reaction was carried out for 120 minutes. The pressure in the reactor was maintained at atmospheric pressure during the polycondensation. Upon completion of the reaction, the amount of m-xylenediamine present in the condensation water discharged from the reaction system was measured by a titration method (indicator: bromophenol blue), which was 0.04% by mole.

Example 2

A polyamide was prepared in the same manner as in Example 1, except that a buffer having an inner diameter of 3.3 cm and an L/D of 4.8 was installed. Upon completion of the reaction, the amount of m-xylenediamine discharged from the reaction system was 0.08% by mole.

Comparative Example 1

A polyamide was prepared in the same manner as in Example 1, except that a buffer was installed. Upon completion of the reaction, the amount of m-xylenediamine discharged from the reaction system was 3.4% by mole.

INDUSTRIAL APPLICABILITY

The apparatus and process for preparing a polyamide according to an embodiment of the present invention are capable of enhancing the degree of fixation of a diamine during the polycondensation reaction of a diamine and a dicarboxylic acid. As a result, since unreacted carboxyl end groups present in the polyamide are reduced, it is possible to prepare a high-molecular-weight polyamide.

The invention claimed is:

1. An apparatus (100) for preparing a polyamide, which comprises a reactor (10) provided with a stirrer (20) in which polycondensation of a diamine and a dicarboxylic acid is carried out; and a buffer (30), a fractionation distillation column (50), and a condenser (70) sequentially installed above the reactor (10), wherein the buffer (30) has an inner diameter larger than that of a pipe connection unit (16) by 10% or more and a ratio of length to inner diameter (L/D) of 1 or more, and the content of the diamine in the condensation water discharged through the condenser is 1% by mole or less.

2. The apparatus (100) for preparing a polyamide of claim 1, wherein the reactor (10) further comprises a heating device capable of heating the reaction mixture inside the reactor to a temperature of 150 to 300° C.

3. The apparatus (100) for preparing a polyamide of claim 1, wherein the buffer (30) has an inner diameter larger than that of the pipe connection unit (16) by 20% or more and a ratio of length to inner diameter (L/D) of 2 to 10.

4. The apparatus (100) for preparing a polyamide of claim 2, wherein the buffer (30) is neither heated nor cooled separately.

5. The apparatus (100) for preparing a polyamide of claim 1, wherein the fractional distillation column (50) has a number of plates, or theoretical plates, of 5 to 30.

6. The apparatus (100) for preparing a polyamide of claim 5, wherein the fractional distillation column (50) has an operating temperature of 100 to 150° C.

7. The apparatus (100) for preparing a polyamide of claim 5, wherein the condenser (70) has an operating temperature of 0 to 20° C.

\* \* \* \* \*